(No Model.)
W. BOSCH.
FASTENING FOR TABLE LEGS.
No. 577,229. Patented Feb. 16, 1897.
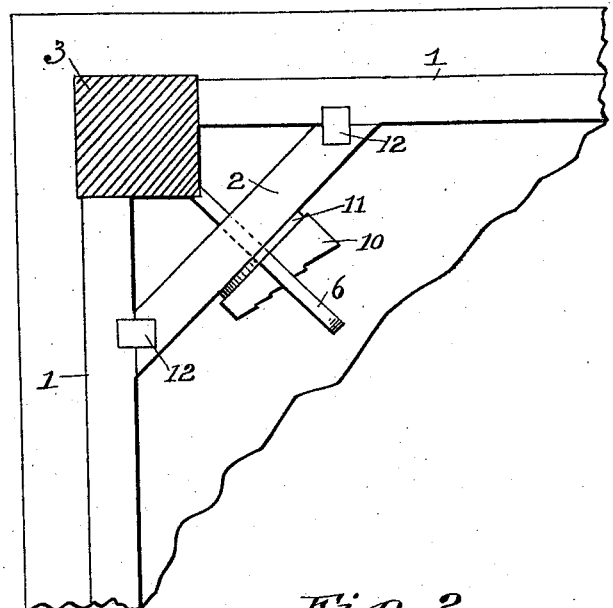
Fig. 1.
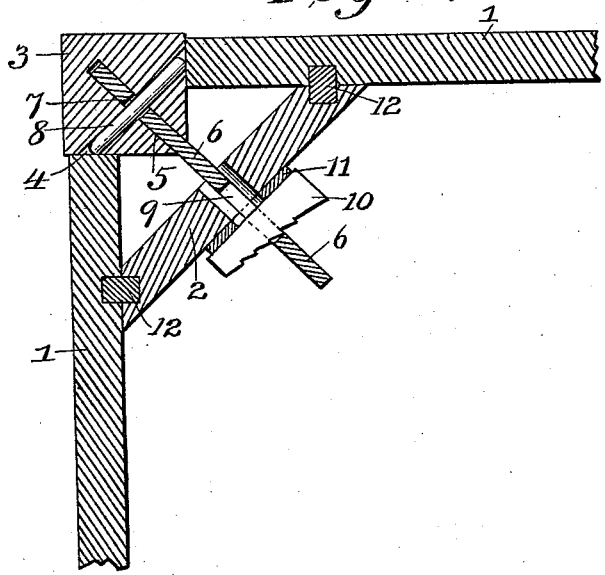
Fig. 2.
Fig. 3.
Witnesses
Jas. H. Blackwood
Albert B. Blackwood
Inventor
William Bosch
by David A. Gourick
Attorney

UNITED STATES PATENT OFFICE.

WILLIAM BOSCH, OF WILLIAMSPORT, PENNSYLVANIA.

FASTENING FOR TABLE-LEGS.

SPECIFICATION forming part of Letters Patent No. 577,229, dated February 16, 1897.

Application filed March 24, 1896. Serial No. 584,657. (No model.)

*To all whom it may concern:*

Be it known that I, WILLIAM BOSCH, a citizen of the United States, residing at Williamsport, in the county of Lycoming and State of Pennsylvania, have invented certain new and useful Improvements in Fastenings for Table-Legs, of which the following is a specification.

My invention relates to improvements in means for uniting the legs of a table with the body thereof, and has for its object to provide an improved construction of a knockdown table whereby the legs may be quickly and securely fastened to the body of the table or removed therefrom without danger of their becoming accidentally detached, while at the same time the parts necessary to accomplish this result are materially simplified.

Heretofore tables designated "knockdown" tables have been held together by means of threaded bolts having nuts fitted thereon. Such construction requires a wrench to tighten the nuts on said bolts when the table is put together or to remove the same when it is taken apart. Such a wrench is not always at hand when it may be desired to remove the legs from the body of the table, as when carrying it from one part of the house to another or when moving it from place to place.

My invention is intended to obviate the difficulties to be met with in separating and again putting together a table, such as would occur were the parts held together in the manner above described. In accomplishing this result I employ the novel combination of elements hereinafter described and claimed, reference being had to the accompanying drawings, in which—

Figure 1 is a bottom plan view of one corner of a table, showing section of one of the legs attached thereto. Fig. 2 is a horizontal section taken through the bolt holding the leg to the frame, and Fig. 3 is a detail view of the connecting-bolt.

In the said drawings the reference-numeral 1 denotes the side pieces of the table-frame, and 2 a diagonal brace uniting the same. The side pieces 1 are not continued until they meet, sufficient space being left between the ends thereof to receive the table-leg 3, as shown. This leg has a diagonal aperture 4 running therethrough from side to side and so located as to be closed by the ends of the side pieces 1 when the leg is in place, as shown. Running at a right angle thereto and through the inner angle of the leg is a second hole or aperture 5, adapted to loosely receive the connecting-bolt 6, hereinafter more fully described. This bolt 6 is apertured near one end at 7 to receive the pin 8, passing through the aperture 4 in the table-leg, thus firmly holding the two together.

When the leg is in place with the bolt 6 united thereto, the latter passes through a central aperture 13 in the diagonal brace 2, projecting a little distance to the other side thereof, as shown. The bolt has also in its inner end an elongated slot 9 to receive the wedge 10, which forms the means for firmly clamping the parts in place. A washer 11 may, if desired, be interposed between the wedge 10 and the inner face of the brace 2 to prevent wear of said brace. It is also found preferable to provide the inclined face of the wedge with teeth, as shown, to insure a firmer hold between the latter and the bolt 6. I have also shown an improved means of connecting the diagonal brace 2 with the side piece 1 of the table, which consists of the intermediate strip 12, countersunk in mortises in both the diagonal brace and the side pieces.

The operation of my device will be understood to be as follows: When it is desired to fasten the leg to the table, the bolt 6 is first inserted in the hole 5 in the leg and the pin 8 then passed through the diagonal aperture 4 and through the hole 7 in the bolt, thus firmly connecting the two together. Now when the table-leg is inserted in place in the table the abutting ends of the side pieces 1 will close the ends of the aperture 4 and effectually prevent the withdrawal of the pin 8. The leg being in place, with the bolt 6 passing through the aperture in the brace 2, the wedge 10 is now inserted and forced into position with its teeth engaging with the inner end of the slot 9 in said bolt, thus wedging the same against the interposed washer 11 and retaining the assembled parts all firmly in place.

Having thus described my invention, what I claim as new, and desire to secure by Letters Patent, is—

1. In a knockdown table the combination with the side pieces of the table-frame, the ends of said side pieces cut away to permit the leg of the table to rest against said ends, of a diagonal brace joined at each of its ends to said side pieces by means of a tongue secured in grooves in said side pieces and the ends of said brace and having an aperture therethrough intermediate of said ends, a slotted bolt secured at its inner end in a recess in said leg by a removable pin placed diagonally in said leg and through an aperture in said bolt, the outer end of said bolt passing through the aperture in said brace and provided with a notched wedge to engage with the outer wall of a slot in said bolt and rest in contact with said brace, substantially as shown and described.

2. In a knockdown table the combination with the ends of the side pieces of the table-frame, the leg of the table interposed between said ends, of a diagonal brace secured at each of its ends by means of a tongue secured in grooves in the ends of said brace and in grooves in said side pieces and having an aperture intermediate of its ends thereof, a slotted bolt secured in a recess in said leg by a removable pin passing through said bolt and diagonally through said leg, the outer end of said bolt passing through the aperture in said brace, a wedge passing through a slot in said bolt and its inner edge supported by said brace, substantially as shown and described.

3. In a knockdown-table frame, the combination with the side pieces of said frame, of a diagonal brace 2 joined at its ends by a tongue secured in grooves in said side pieces and in the ends of said brace to said side pieces, the leg 3 provided with the diagonal aperture 4 therethrough and the diagonal aperture 5 therein, the perforated bolt 6 resting in said aperture 5 and pivoted therein by a pin 8 passing through the aperture 7 in said perforated bolt 6 and the said aperture 4 in said leg 3, the opposite end of said perforated bolt 6, passing through the aperture 13 in said diagonal brace 2, a slot 9 in the outer end of said bolt adapted to receive the wedge or key 10 provided with teeth to engage in said slot and secure said leg 3 in the corner of said table-frame, substantially as shown and described.

In testimony whereof I hereto affix my signature in the presence of two witnesses.

WILLIAM BOSCH.

Witnesses:
JOSEPH H. MACKEY,
JOSHUA HORNER, Jr.